United States Patent
Wagner et al.

(10) Patent No.: US 8,448,918 B2
(45) Date of Patent: May 28, 2013

(54) GATE VALVE FOR A VACUUM CHAMBER AND VACUUM CHAMBER

(75) Inventors: Philipp Wagner, Bad Ragaz (CH); Andreas Meier, Ruggell (LI); Christian Egli, Sevelen (CH)

(73) Assignee: TEL Solar AG, Truebbach (CH)

( * ) Notice: Subject to any disclaimer, the term of this patent is extended or adjusted under 35 U.S.C. 154(b) by 264 days.

(21) Appl. No.: 12/808,337

(22) PCT Filed: Dec. 19, 2008

(86) PCT No.: PCT/EP2008/010909
§ 371 (c)(1),
(2), (4) Date: Jul. 22, 2010

(87) PCT Pub. No.: WO2009/080304
PCT Pub. Date: Jul. 2, 2009

(65) Prior Publication Data
US 2010/0300920 A1     Dec. 2, 2010

Related U.S. Application Data

(60) Provisional application No. 61/015,396, filed on Dec. 20, 2007.

(51) Int. Cl.
*F16K 3/18* (2006.01)
(52) U.S. Cl.
USPC .......... 251/193; 251/228; 251/229; 251/280; 251/300
(58) Field of Classification Search
USPC ................ 251/228–229, 158, 193, 279–280, 251/300–301, 326–329
See application file for complete search history.

(56) References Cited

U.S. PATENT DOCUMENTS

| | | | | |
|---|---|---|---|---|
| 1,707,125 A | * | 3/1929 | Loffler | 251/193 |
| 2,389,947 A | * | 11/1945 | Allen | 251/359 |
| 2,535,525 A | * | 12/1950 | Wolfe | 251/228 |
| 3,119,594 A | * | 1/1964 | Heggem | 251/228 |
| 3,510,101 A | * | 5/1970 | Burtis | 251/228 |
| 3,632,080 A | * | 1/1972 | King | 251/228 |
| 5,244,011 A | * | 9/1993 | Feldinger | 137/614.13 |
| 5,501,427 A | * | 3/1996 | Ando | 251/228 |
| 6,386,511 B1 | * | 5/2002 | Watanabe et al. | 251/301 |
| 2006/0081296 A1 | * | 4/2006 | Schwartz et al. | 137/614.11 |

FOREIGN PATENT DOCUMENTS

| | | |
|---|---|---|
| FR | 1493479 | 9/1967 |
| GB | 149855 | 8/1920 |
| GB | 257254 | 9/1926 |
| GB | 929192 | 6/1963 |
| JP | 60222670 | 11/1985 |

* cited by examiner

*Primary Examiner* — John Bastianelli
(74) *Attorney, Agent, or Firm* — Notaro, Michalos & Zaccaria P.C.

(57) ABSTRACT

A gate valve for a vacuum chamber comprises two carriers (5a) each connected to a frame structure providing an essentially plane front by two parallel links (6) and to an actuating rod (12a) by parallel levers (14). Upward motion of the actuating rods (12a) by a piston (17) causes, via the levers (14), upward motion of the carriers (5a) which is transformed into a circular motion by the links (6) where the carriers (5a) at the same time approach the front while remaining parallel to it, moving sealing plates (9) which are fixed to the carriers (5a) to an active position where they press against the front and seal openings (3) therein. Retraction of the piston (17) effects an inverse motion, whereby the sealing plates (9) are completely removed from the openings (3) and the latter made easily accessible.

14 Claims, 2 Drawing Sheets

GATE VALVE FOR A VACUUM CHAMBER AND VACUUM CHAMBER

FIELD OF THE INVENTION

The invention concerns a gate valve for closing openings in a wall of a vacuum chamber where diverse processing steps like physical vapour deposition, plasma etching etc. can be carried out as well as a vacuum chamber comprising at least one such gate valve.

PRIOR ART

JP 60 222 670 A shows a gate valve of the generic type where a carrier with a sealing plate fixed to it is connected by two parallel links to an actuating rod reciprocatable in a vertical direction parallel to a vertical front of a frame structure which is interrupted by an opening. In an inactive position of the sealing plate the latter is kept at a distance from the front by the action of a spring. Upward motion of the actuating rod causes the sealing plate to reach a stop extending from the front which, upon further upward movement of the actuating rod, deflects the motion of carrier horizontally towards the front whereby the sealing plate eventually reaches an active position where it seals the opening.

As the sealing member is not linked to the frame structure but merely to the actuating rod its position relative to the front cannot be controlled with great precision. This may be disadvantageous, in particular, when the sealing plate is in its active position where it must reliably seal the opening even under severe mechanical stresses caused by substantial pressure differences. The fact that the sealing member slides along the stop may lead to the formation of nanoparticles which may in turn result in damage to the articles processed in the vacuum chamber.

FR 1 493 479 A shows a stop valve of similar structure. A round sealing member is mounted on a carrier plate which is connected to an actuating rod by two pairs of parallel links. When, during a downward motion of the actuating rod, two rollers mounted on the carrier reach horizontal strips which act as a stop for the carrier the latter is forced to move horizontally into a position where the sealing member abuts against an end of a tube, sealing the circular opening of the latter.

A stop valve of virtually identical structure is described in GB 257 254 A.

SUMMARY OF THE INVENTION

It is an object of the present invention to provide a gate valve of the generic type as circumscribed in the generic part of claim 1 which allows the position of the sealing member, in particular in the active position of the latter, to be controlled with great precision.

This object is achieved by the features in the characterising clause of claim 1. The invention provides a gate valve which is simple, space-saving and reliable and can be actuated by a simple linear drive, e.g., a piston. It also offers facile maintenance, being easy to assemble and disassemble. The invention also provides a vacuum chamber which is easy to use and reliable and has a relatively small footprint.

BRIEF DESCRIPTION OF THE DRAWINGS

In the following the invention is described in more detail with reference to drawings referring to an embodiment of the invention where.

DESCRIPTION OF THE PREFERRED EMBODIMENTS

Figure 1:
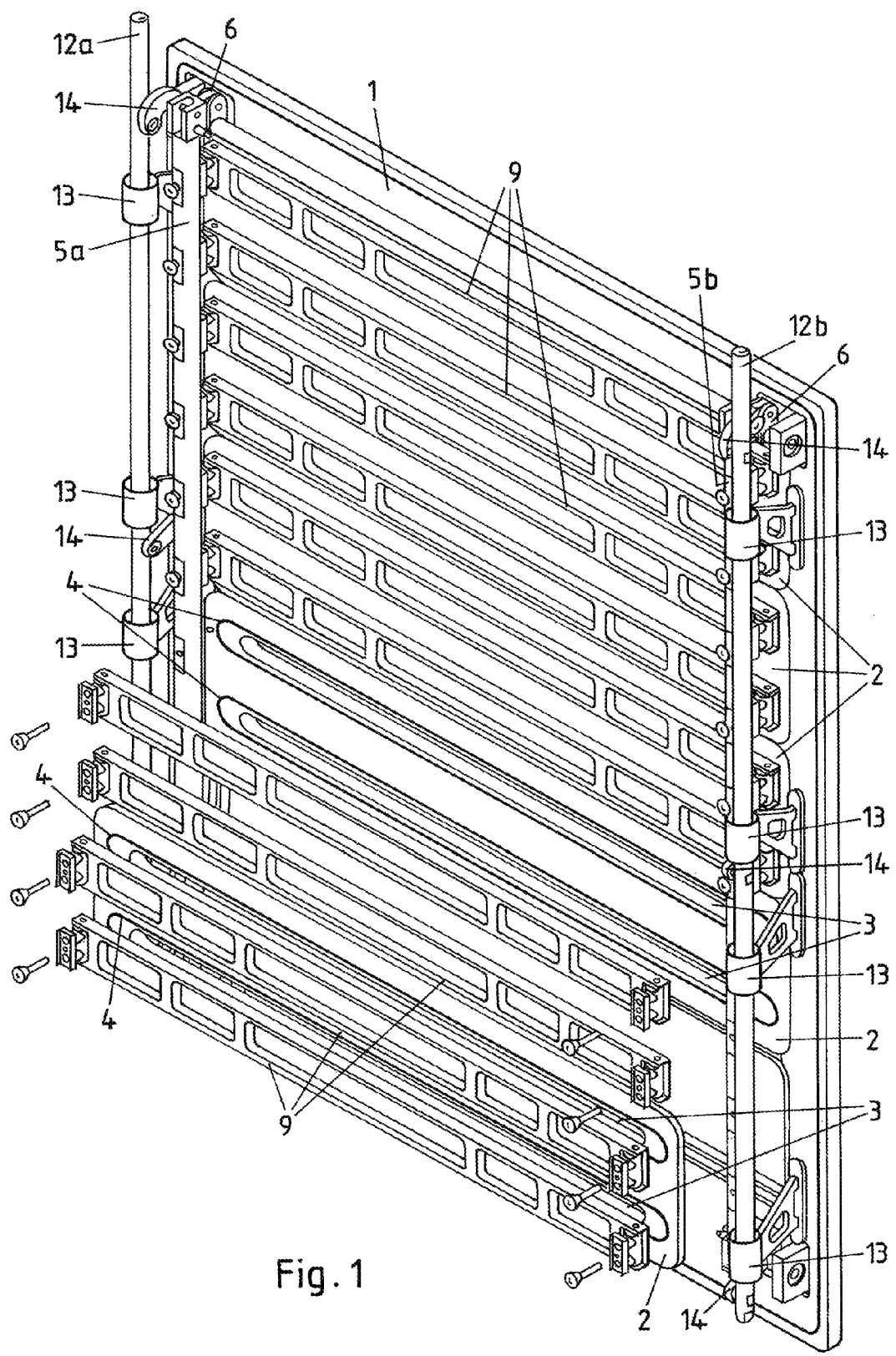
FIG. 1 shows a gate valve according to the invention and adjoining parts of a vacuum chamber, in part in exploded view.

The vacuum chamber which may be part of an assembly of vacuum chambers with a transport unit as shown in U.S. Pat. No. 5,693,238 A comprises (FIG. 1) a frame structure consisting of an outer frame 1 which surrounds a relatively large essentially oblong frame opening. The latter is filled by several also essentially oblong wall plates 2 which follow upon each other in a longitudinal direction which coincides with the vertical. Each of the wall plates 2 is provided with two slot-like openings 3 which are arranged one above the other and extend essentially over the wall plate 2 in a lateral direction which is perpendicular to the longitudinal direction and consequently horizontal. Through each of the openings 3 a compartment of the vacuum chamber is accessible. Each opening 3 is surrounded by an O-ring 4 as an elastic sealing means.

The frame structure, i.e., the outer frame 1 and the wall plates 2, define a substantially plane front facing away from the compartments which contains the openings 3. At a distance from this front a gate valve for sealing the openings 3 is arranged which comprises two rod-shaped carriers 5a,b which are each connected to the outer frame 1 by two links 6 at their upper ends and lower ends, respectively, i.e., at positions spaced from each other in the longitudinal direction. The links 6 are connected to the outer frame 1 on the one hand and the carrier 5a;b on the other hand pivotably about axes 7; 8 parallel to the lateral direction. As for each one of the links 6 the distance between the two axes 7, 8 is the same the outer frame 1, the carrier 5a;b and the links 6 connecting each carrier 5a;b to the outer frame 1 form a parallelogram suspension for the carrier 5a;b, i.e., a mechanical guide means which causes its distance from the frame structure to vary while it remains parallel to the longitudinal direction whenever it is shifted longitudinally forward and backward over a switching interval.

Figure 2:
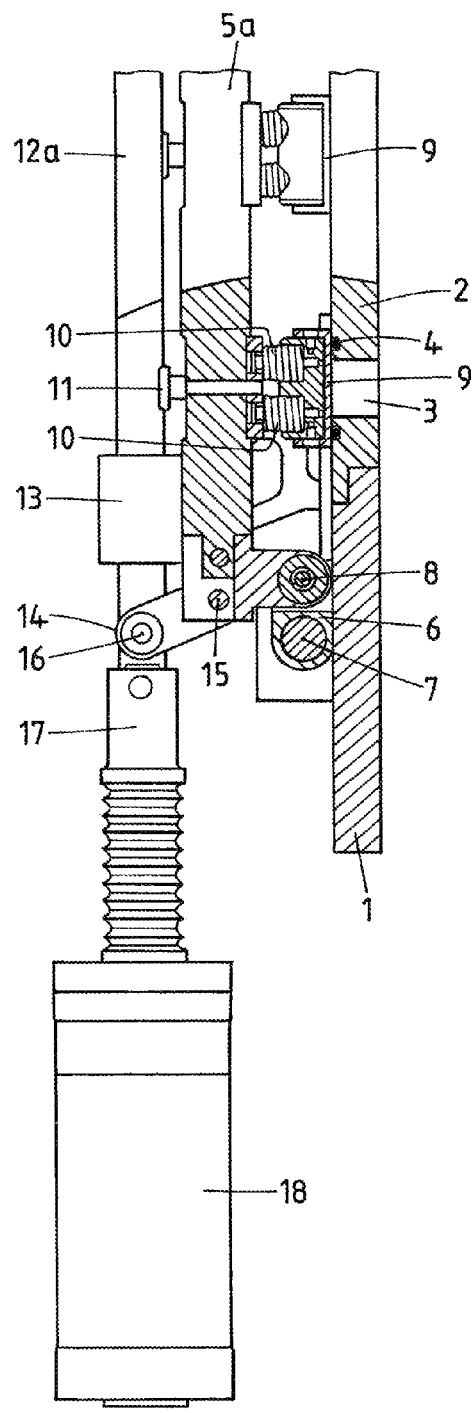
FIG. 2 shows a partial sectional view of the gate valve and adjoining parts of the vacuum chamber as shown in FIG. 1, with the gate valve in a first state.
Figure 3:
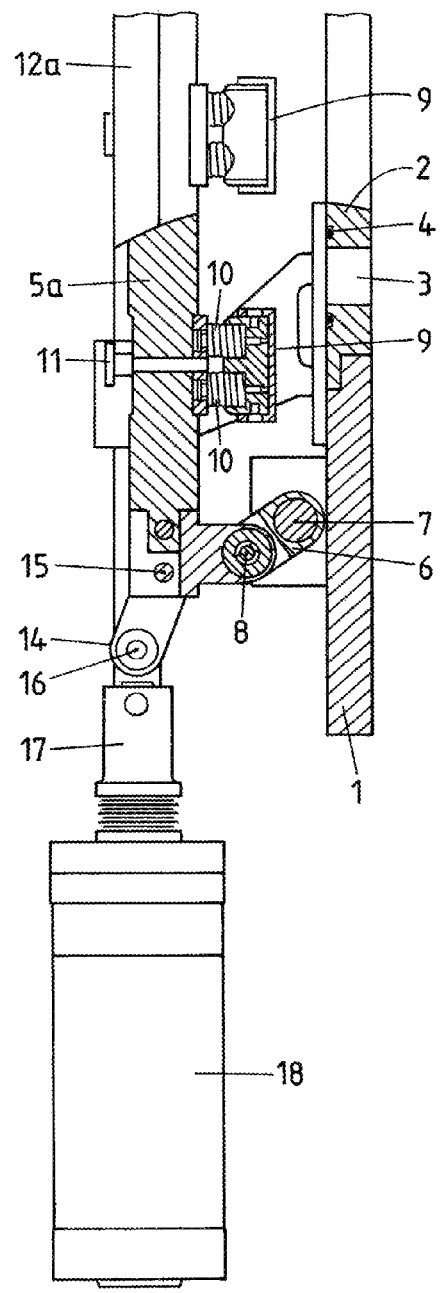
FIG. 3 shows a partial sectional view essentially like FIG. 2, with the gate valve in a second state.

The carriers 5a,b carry a longitudinal row of bar-shaped sealing plates 9, one sealing plate 9 for each one of the openings 3. The sealing plates 9 extend in the lateral direction from the carrier 5a to the carrier 5b. Their opposite end portions are fixed to the first and to the latter, respectively. The surface of each sealing plate 9 facing the front of the frame structure is essentially plane but slightly convex along the lateral direction. Each sealing plate 9 is connected to each carrier 5a;b by a pair of compression springs 10 (s. FIGS. 2, 3) such that the sealing plate 9 is displaceable in a direction away from the front against their elastic force. The displacement is limited by an adjustable stop, a spacer bolt 11 mounted on the carrier 5a;b.

Two actuating members in the shape of actuating rods 12a, b extend in the longitudinal direction, each guided by a succession of plain bearing bushes 13 mounted to the outer frame 1. Each actuating rod 12a;b is close to one of the carriers 5a;b and connected to it at its lower and at its upper end and in the middle, respectively, by three levers 14 which are appropriately spaced in the longitudinal direction. Each lever 14 is pivotable with respect to the carrier 5a;b about an axis 15 and with respect to the actuating rod 12a;b about an axis 16 with both axes parallel to the lateral direction. The carrier 5a;b, the levers 14 and the actuating rod 12a;b again form a paralleogram connection allowing the distance between the actuating rod 12a;b and the carrier 5a;b to vary in a direction perpendicular to the front while keeping them parallel. Each actuating rod 12a;b is mounted on a piston 17 of a pneumatic drive 18, which acts as a linear drive for the actuating rod 12a;b.

In FIG. 2 the sealing plates 9 are in an active position. Each of them presses against a plane front of one of the wall plates 2 which surrounds one of the openings 3 and in particular against the O-ring 4, compressing the same and thereby keeping the opening 3 sealed. As the surfaces of the sealing plates 9 are slightly convex the latter are deformed somewhat when pressed against the front whereby the pressure is equalised and the sealing effect at the central parts of the sealing plate 9 which are removed from the carriers 5a, b is improved. The compartments closed by the sealing plates 9 can then be evacuated and a vacuum processing step like PVD or plasma etching carried out therein. Depending on the construction details a relatively large pressure difference between the compartments and the outside is feasible.

To open the compartments the pistons 17 are retracted, drawing the actuating rods 12a, b downward. Via the levers 14 the carriers 5a, b are also forced downward and pulled away from the front. Due to the guidance by the links 6 the motion of the carriers 5a, b follows a defined circular path, the carriers 5a, b first moving the sealing plates 9 in parallel away from their active positions essentially perpendicularly and then more and more in a downward direction. When the carriers 5a, b reach the opposite end of the switching interval, the sealing plates 9 are at inactive positions (FIG. 3) where the orthogonal projection of each sealing plate 9 onto the front does not overlap with the opening 3 it covers in its active position. The sealing plate 9 is completely out of the way and the compartment is easily accessible through the opening 3 in a direction perpendicular to the said plane. Insertion or retrieval of a substrate to be treated or having been treated, respectively, by a transport device can be carried out largely unencumbered by the gate valve.

For bringing the sealing plates 9 back to their active positions where they seal the openings 3 the piston 17 is extended and the actuating rods 12a, b, the levers 14, and the carriers 5a, b are each subjected to a reverse motion along the same trajectory. The final parallel motions of the sealing plates 9 into their active positions are essentially perpendicular to the frame whereby friction is avoided.

LIST OF REFERENCE SYMBOLS 1 outer frame
2 wall plate
3 opening
4 O-ring
5a, b carriers
6 link
7, 8 axes
9 sealing plate
10 compression spring
11 spacer bolt
12a, b actuating rods
13 plain bearing bush
14 lever
15, 16 axes
17 piston
18 pneumatic device

The invention claimed is:

1. A gate valve for sealing at least one opening in a substantially plane front of a frame structure, comprising at least one carrier extending in a longitudinal direction at a distance from the front and a sealing plate for sealing the at least one opening fixed to the said at least one carrier, the carrier being movable forward and backward parallel to the longitudinal direction over a switching interval and the at least one sealing plate being movable between an active position where the carrier is in contact with a part of the front surrounding the opening, thereby sealing the opening, and an inactive position where it is at a distance from the said front, leaving the opening uncovered, and further comprising mechanical guide means with at least two parallel links offset in the longitudinal direction, each link being connected to the carrier pivotably about an axis extending in a lateral direction which is parallel to the front and perpendicular to the longitudinal direction and connectable to the frame structure pivotably about an axis extending in a lateral direction which is parallel to the front and perpendicular to the longitudinal direction, for the links to guide the at least one carrier such that forward motion causes it to at the same time approach the front, the at least one sealing plate assuming its active position, whereas backward motion causes it to move away from the front, the at least one sealing plate assuming its inactive position.

2. The gate valve of claim 1, where in the inactive position the orthogonal projection of the at least one sealing plate onto the front does not overlap with the at least one opening.

3. The gate valve of claim 1, where the guide means control the motion of the at least one carrier in such a way that the at least one sealing plate approaches the active position in a direction essentially perpendicular to the front.

4. The gate valve of claim 1, where the at least one sealing plate is connected to the at least one carrier in such a way that the at least one sealing plate is displaceable away from the front against an elastic force.

5. The gate valve of claim 4, where the range of displacement of the sealing plate is limited with the limit being adjustable.

6. The gate valve of claim 1, further comprising at least one actuating member extending in the longitudinal direction and movable parallel to the same forward and backward by an actuating means, the at least one actuating member being connected to at least one carrier in such a way that forward and backward motion of the actuating member causes motion of the carrier in the same direction in each case while allowing relative motion of the carrier with respect to the actuating member in a direction perpendicular to the front.

7. The gate valve of claim 6, where the connection between the at least one actuating member and the at least one carrier comprises at least two parallel levers offset in the longitudinal direction, each lever being connected to the actuating member and to the carrier pivotably about axes parallel to the front and perpendicular to the longitudinal direction.

8. The gate valve of claim 6, where the at least one actuating member is in the shape of an actuating rod parallel to the longitudinal direction and the actuating means is a linear drive.

9. The gate valve of claim 1, comprising a plurality of sealing plates arranged in a row extending in the longitudinal direction, the individual sealing plates each being bar-shaped and extending in a lateral direction parallel to the front and perpendicular to the longitudinal direction, the sealing plates being suitable for closing openings arranged in a row extending in the longitudinal direction where each opening forms a slot extending in the lateral direction.

10. The gate valve of claim 1, comprising at least two carriers offset in a lateral direction parallel to the front and perpendicular to the longitudinal direction, with opposite end portions of the at least one sealing plate being each fixed to one of the carriers.

11. A vacuum chamber comprising a frame structure with a substantially plane front which surrounds at least one opening and further comprising at least one gate valve for sealing the at least one opening, the gate valve comprising at least one carrier extending in a longitudinal direction at a distance from the front and a sealing plate for sealing the at least one opening fixed to the said at least one carrier, the at least one carrier being movable forward and backward parallel to the longitudinal direction over a switching interval and the at least one sealing plate being movable between an active position where the carrier is in contact with a part of the front surrounding the opening, thereby sealing the opening, and an inactive position where it is at a distance from the said front, leaving the opening uncovered, and further comprising mechanical guide means with at least two parallel links offset in the longitudinal direction, each link being connected to the frame structure and to the carrier pivotably about an axis extending in each case in a lateral direction which is parallel to the front and perpendicular to the longitudinal direction, for the links to guide the at least one carrier such that forward motion causes it to at the same time approach the front, the at least one sealing plate assuming its active position, whereas backward motion causes it to move away from the front, the at least one sealing plate assuming its inactive position.

12. The vacuum chamber of claim 11, where the at least one opening is surrounded by an elastic sealing means mounted on the front which is compressed by the sealing plate when the latter is in its active position.

13. The vacuum chamber of claim 11, comprising at least one stack of compartments where each compartment is accessible through one of the openings.

14. The gate valve of claim 8, wherein the linear drive is a pneumatic drive comprising a piston to which the actuating rod is connected.

* * * * *